United States Patent
Chih-Yung et al.

(10) Patent No.: US 8,537,135 B2
(45) Date of Patent: Sep. 17, 2013

(54) SENSORY STRUCTURE OF TOUCH PANEL

(75) Inventors: Ting Chih-Yung, Hsinchu (TW); Lin Yih-Jer, Hsinchu (TW)

(73) Assignee: Cando Corporation (TW)

( * ) Notice: Subject to any disclaimer, the term of this patent is extended or adjusted under 35 U.S.C. 154(b) by 986 days.

(21) Appl. No.: 12/285,647

(22) Filed: Oct. 10, 2008

(65) Prior Publication Data

US 2009/0160824 A1 Jun. 25, 2009

(30) Foreign Application Priority Data

Dec. 25, 2007 (TW) .............................. 96222048 U

(51) Int. Cl.
*G06F 3/045* (2006.01)

(52) U.S. Cl.
USPC ........................................ 345/174; 178/18.06

(58) Field of Classification Search
None
See application file for complete search history.

(56) References Cited

U.S. PATENT DOCUMENTS

| | | | |
|---|---|---|---|
| 6,188,391 B1 * | 2/2001 | Seely et al. | 345/173 |
| 7,030,860 B1 | 4/2006 | Hsu et al. | |
| 2002/0190961 A1 * | 12/2002 | Chen | 345/173 |
| 2006/0066590 A1 * | 3/2006 | Ozawa et al. | 345/173 |
| 2008/0264699 A1 * | 10/2008 | Chang et al. | 178/18.01 |
| 2008/0309635 A1 * | 12/2008 | Matsuo | 345/173 |
| 2009/0277695 A1 * | 11/2009 | Liu et al. | 178/18.03 |
| 2010/0073319 A1 * | 3/2010 | Lyon et al. | 345/174 |

* cited by examiner

*Primary Examiner* — Andrew L Sniezek
(74) *Attorney, Agent, or Firm* — Bacon & Thomas, PLLC

(57) ABSTRACT

A two-dimensional sensory structure for the capacitive touch panel is provided. The provided two-dimensional sensory structure includes a substrate having plural first metal structures and second metal structures on a first surface thereof, a dot-like insulating layer located on the substrate and composed of plural insulating dots, and an electrode layer located on the dot-like insulating layer and composed of plural conductive traces. The insulating dots are each corresponding to the first metal structures respectively, and thereby a first portion of the conductive traces arranged along a first direction are electrically connected to each other, and the conductive traces that are arranged along a second direction are electrically insulated therefrom. The thickness of the touch panel according to the invention is effectively reduced.

17 Claims, 10 Drawing Sheets

SENSORY STRUCTURE OF TOUCH PANEL

BACKGROUND OF THE INVENTION

1. Field of the Invention

The present invention relates to a sensory structure of a touch panel, and more particularly to a sensory structure of a capacitive touch panel.

2. Description of the Related Art

Touch sensing technology is broadly applied in the present electronic application for data input. In this case, the information is read out or transmitted while the user touches the screen with the finger or the stylus, so that the buttons, keyboards or joysticks, which are desired for the conventional electronic apparatus, could be omitted.

Depending on the principles adopted for sensing, the touch panels are grouped into such as resistive touch panels, capacitive touch panels, infrared (IR) touch panels and ultrasonic wave ones. Regarding the IR touch panels and the ultrasonic wave ones, an IR or ultrasonic wave transmitting unit is arranged on one side of the respective X-direction and Y-direction of the screen, and on the other side thereof a receiving unit is configured. The movement of IR-ray or ultrasonic wave would be changed while the screen is touched by the user, and the touch position is accordingly measured and determined for data input. With respect to the resistive touch panel, which is fabricated by the lamination of an upper and a lower indium tin oxide (ITO) conductive films, the voltage variation thereof is generated while the upper and the lower electrodes of ITO are conducted through the touch pressure, and is detected by a controller, so that the touch position for data input is determined. The capacitive touch panel is constructed by the transparent glass substrate with a layer of metal oxide coated thereon, where a uniformly distributed electrical field is produced throughout the surface of the substrate by the application of voltage from the four corners thereof. By detecting the capacitance variation caused by static-electric reaction between the user's finger and the electric field, the touch position for data input is determined.

The capacitive touch panel is advantageous in the design of dust-preventing, anti-fire, anti-scratch and high resolution. Nevertheless, an erroneous determination may occur in case of being exposed to electrostatic or humid environment since the sensory structure of the capacitive touch panel is easily affected thereby. Accordingly, it is relatively more difficult to design the structure and circuitry of the sensory structure to further increase the sensitivity of the capacitive touch panel, and hence the fabrication cost thereof may be so significant.

U.S. Pat. No. 7,030,860 B1 discloses a capacitive sensing system with high transparency and sensitivity, in which the sensory structure is constructed with a flexible substrate and thus can be integrated into various kinds of electronic devices. With reference to FIG. 1A, the one-dimensional capacitive sensing system 1 according to U.S. Pat. No. 7,030,860 B1 is illustrated. The capacitive sensing system 1 is constructed by a transparent substrate 10 and a further transparent substrate 14 coated with a transparent conductive layer 16, where the substrates 10 and 14 are bonded with other by the application of an adhesive layer 12. Moreover, if a two-dimensional capacitive sensing system 100 is to be fabricated, a set of two different transparent substrates 14A and 14B must be provided on two opposite sides of an insulating layer 18 where the transparent substrates 14A and 14B have the respective transparent conductive layers 16A and 16B that are patterned in different directions, i.e. x-direction and y-direction respectively, as shown in FIG. 1B.

The above sensing system is designed as a multi-layer structure, so that the construction of the capacitive touch panel having the same is relatively complicated. Upon on fabrication, such sensing system needs five to ten film-processing procedures, and the use of two substrates as well as one to three full insulating layers is necessary, which fails to meet the demands for compactness. Furthermore, the above capacitive sensing system adopts the indium tin oxide (ITO) electrode for serving as the upper and lower conductive electrodes thereof, the sensitivity would be relatively reduced since the conductivity of ITO is insufficient for its high resistivity.

For overcoming the mentioned issues, it is desired in this art to provide a sensory structure of the capacitive touch panel with a relatively lower resistance so as to increase the sensitivity thereof. In addition, a sensory structure having a simplified structure and even reduced thickness is preferred for saving the fabrication cost thereof.

SUMMARY OF THE INVENTION

It is a first aspect of the present invention to provide a two-dimensional sensing structure of a capacitive touch panel having an insulating layer of designed pattern, which is fabricated by a simplified process.

It is a second aspect of the present invention to provide a two-dimensional sensing structure of a capacitive touch panel in which only one substrate is needed and the multiple full insulating layers are omitted, so that the capacitive touch panel according to the present invention has a reduced thickness.

It is a third aspect of the present invention to provide a two-dimensional sensing structure of a capacitive touch panel in which the conventional upper and lower transparent electrodes are replaced by a metal electrode with the cooperation of an indium tin oxide (ITO) electrode, so that the resistance of the sensing structure is reduced and the sensitivity of the capacitive touch panel is thus improved.

It is a fourth aspect of the present invention to provide a two-dimensional sensing structure of a capacitive touch panel having a patterned overcoat for forming the bridge connection between two electrode layers.

In accordance with the mentioned aspects, a two-dimensional sensing structure of a capacitive touch panel is provided. The provided two-dimensional sensing structure includes a substrate having a plurality of metallic structures on a first surface thereof, a first electrode layer located on the first surface and including a plurality of first sensing areas electrically connected with each other in a first direction, a dot-like insulating layer located on the first electrode layer and including a plurality of insulating bodies respectively positioned correspondingly to the first sensing areas, and a second electrode layer located on the dot-like insulating layer and including a plurality of second sensing areas electrically connected with each other in a second direction different from the first direction.

Preferably, the two-dimensional sensing structure further includes at least one first conductive trace connecting one of the first sensing areas to another one of the first sensing areas in the first direction.

Preferably, the two-dimensional sensing structure further includes at least one second conductive trace connecting one of the second sensing areas to another one of the second sensing areas in the second direction.

Preferably, the two-dimensional sensing structure further includes a protection layer on the second electrode layer, and the metallic structures are exposed out of the protection layer.

Preferably, the protection layer includes a pattern layer on either one side thereof, so as to provide an appearance of periphery-like pattern.

Preferably, the protection layer includes an optical coating layer on either one side thereof which is one selected from a group consisting of an anti-reflection layer, an anti-glare layer and an anti-static layer.

Preferably, the protection layer is provided with the pattern layer and/or the optical coating layer before being attached on said second electrode layer.

Preferably, the substrate is a transparent substrate, and on a second surface thereof, opposite to the first surface, a color filter or a black matrix layer, or even both are provided.

Preferably, the first sensing areas and the second sensing areas are arranged as a first array and a second array respectively.

Preferably, each of the first and second sensing areas is shaped as diamond, rectangular, triangular or a combination thereof.

In accordance with the mentioned aspects, the present invention provides a further two-dimensional sensing structure of a capacitive touch panel, which includes a substrate having a plurality of first conductive structures and having a plurality of second conductive structures for external connection, a dot-like insulating layer located on the substrate and including a plurality of insulating bodies, each of which is positioned correspondingly to each of the first conductive structures respectively, and an electrode layer located on the dot-like insulating layer and including an array of sensing areas, wherein a first portion of the sensing areas are electrically connected with each other in a first direction through at least one of the first conductive structures.

Preferably, in the provided two-dimensional sensing structure, a second portion of the sensing areas are electrically connected with each other through at least one of conductive traces in a second direction different from the first direction.

Preferably, the two-dimensional sensing structure further includes a protection layer on the electrode layer, and the second conductive structures are exposed out thereof.

Preferably, the protection layer includes a pattern layer on either one side thereof, so as to provide an appearance of periphery-like pattern.

Preferably, the protection layer includes an optical coating layer on either one side thereof which is one selected from a group consisting of an anti-reflection layer, an anti-glare layer and an anti-static layer.

Preferably, the protection layer is provided with the pattern layer and/or the optical coating layer before being attached on said second electrode layer.

Preferably, each of the sensing areas is shaped as diamond, rectangular, triangular or a combination thereof.

Preferably, the substrate is a transparent substrate, and on a second surface thereof, opposite to the first surface, a color filter or a black matrix layer, or even both are provided.

In accordance with the mentioned aspects, the present invention provides still a further two-dimensional sensing structure of a capacitive touch panel, which includes a substrate having a plurality of conductive structures on a first surface thereof, a first electrode layer located on the first surface and including a plurality of sensing areas electrically connected with each other in a first direction, an insulating protection layer covering above the first electrode layer and patterned in such a way that the sensing areas of the first electrode layer are exposed, and a second electrode layer covering above the insulating protection layer, wherein the second electrode layer has a portion connected to the exposed sensing areas.

Preferably, the two-dimensional sensing structure further includes a protection layer on the second electrode layer, and the conductive structures are exposed out of the protection layer.

Preferably, the protection layer includes a pattern layer on either one side thereof, so as to provide an appearance of periphery-like pattern.

Preferably, the protection layer includes an optical coating layer on either one side thereof which is one selected from a group consisting of an anti-reflection layer, an anti-glare layer and an anti-static layer.

Preferably, the protection layer is provided with the pattern layer and/or the optical coating layer before being attached on said second electrode layer.

Preferably, in the two-dimensional sensing structure, each of the sensing areas is shaped as diamond, rectangular, triangular or a combination thereof.

Preferably, the substrate is a transparent substrate, and on a second surface thereof, opposite to the first surface, a color filter or a black matrix layer, or even both are provided.

DETAILED DESCRIPTION OF THE PREFERRED EMBODIMENT

Figure 1A:
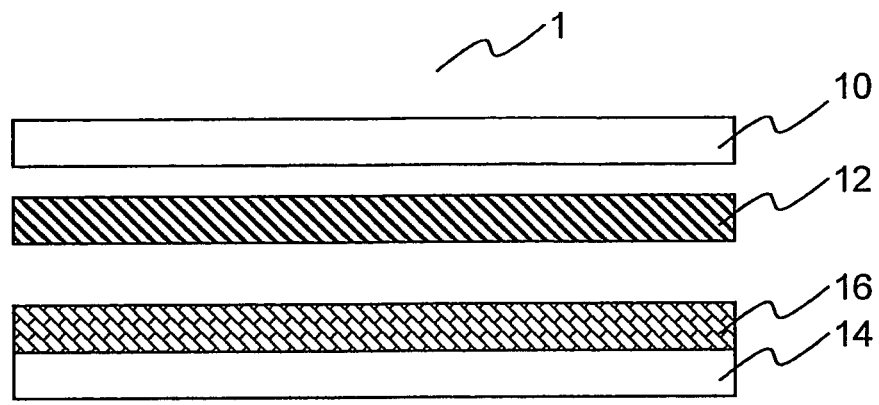
FIG. 1 is a cross-sectional view schematically showing the conventional sensing structure of a capacitive touch panel according to the prior art.
Figure 1B:
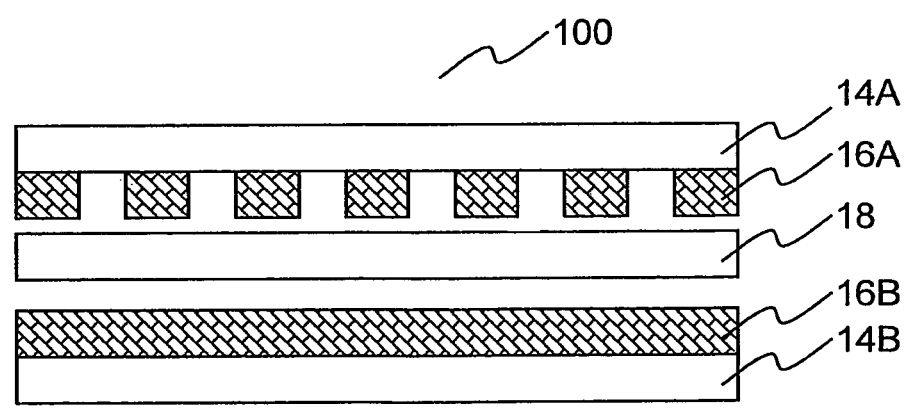

With reference to the following disclosures combined with the accompanying drawings, the sensing structure of a capacitive touch panel according to the present invention is illustrated and understood. It should be noted that the accompanying drawings are provided only for illustration where the size or scale of the elements shown therein are not necessarily the actual one. Furthermore, some elements of the touch panel that are well known in this art are omitted in the drawings for the purpose of simplicity.

FIGS. 2A to 2E are top views schematically showing the formation of sensing structure of a capacitive touch panel in accordance with a preferred embodiment of the present invention.

Figure 2A:
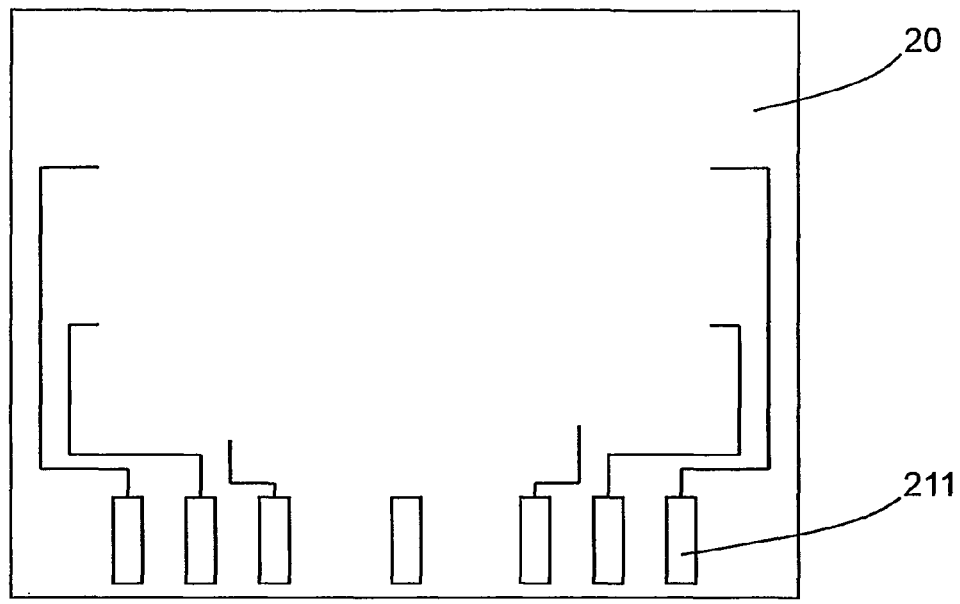
FIGS. 2A to 2E are top views schematically showing the sensing structure of a capacitive touch panel in accordance with a preferred embodiment of the present invention.

First, the glass substrate 20 is provided with a metal layer, as shown in FIG. 2A. The metal layer is patterned in a form of multiple wirings and contact strips 211 for further being connected to the external.

Figure 2B:
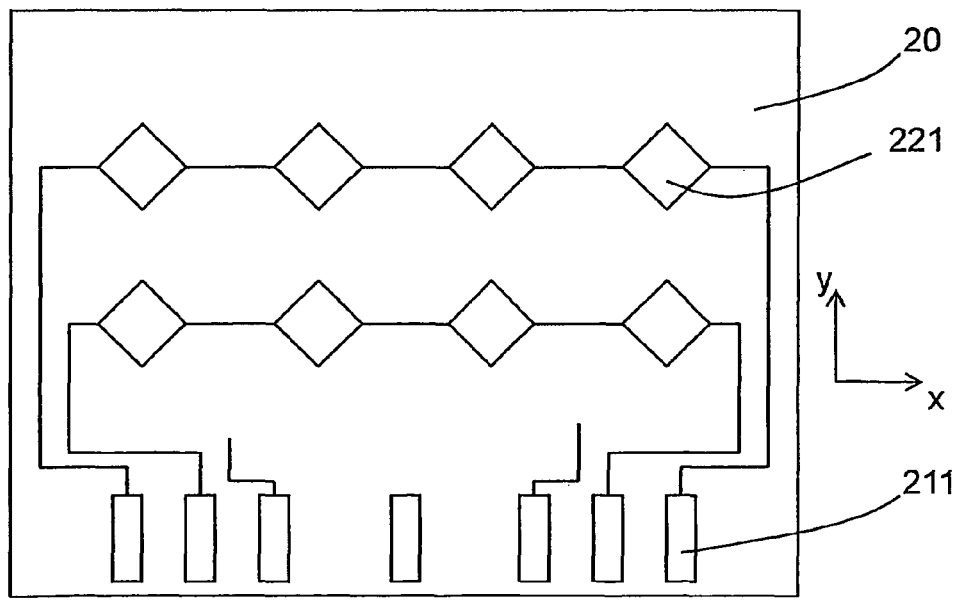
Figure 2C:
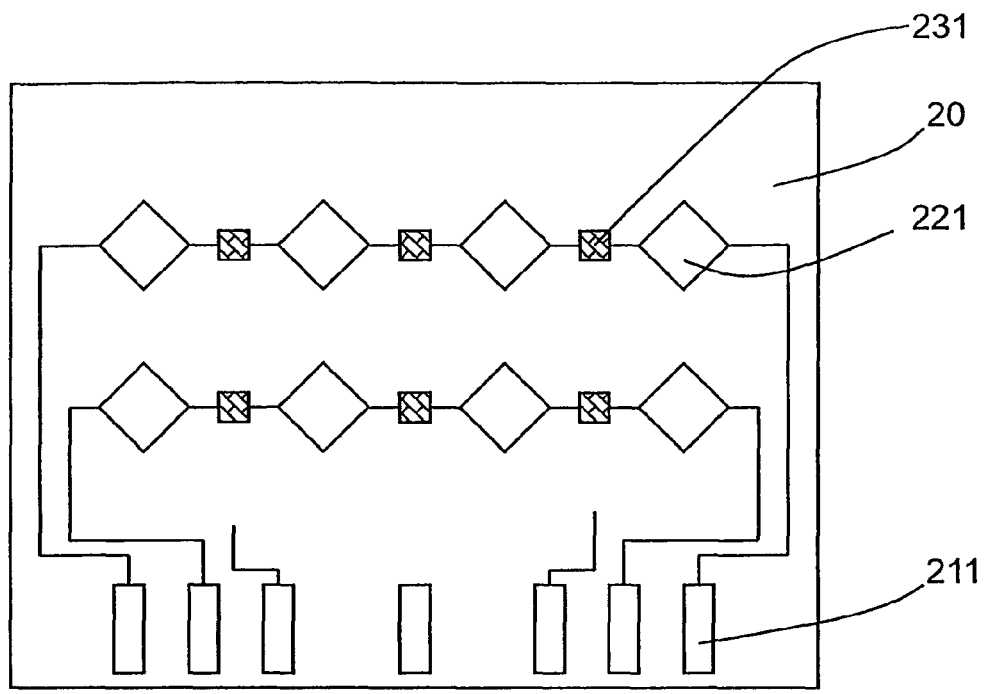

Above the metal layer including the wirings and contact strips 211, a first electrode layer of plural sensing areas 221 that are arranged as a regular sensing array and electrically connected with each other in the x-direction is provided, as shown in FIG. 2B. A layer of insulating pattern is provided on the first electrode layer, so as to replace the overcoat of a conventional sensing structure. The layer of insulating pattern is composed of plural insulating dots 231, and each of which is located on a position corresponding to the respective sensing areas 221 of the first electrode layer, as shown in FIG. 2C. In this embodiment, each of the insulating dots 231 is provided to cover the area between two sensing areas 221 that are adjacent to each other, so as to make the first electrode layer insulating from the further electrode layer.

Figure 2D:
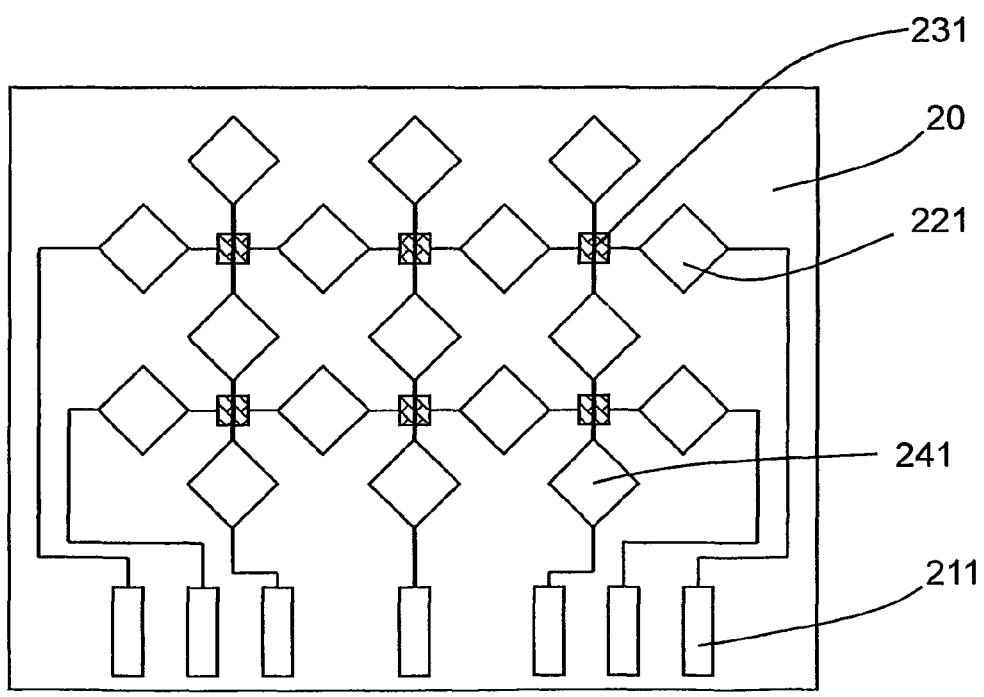

Afterward, a second electrode layer is provided on the layer of insulating pattern. The second electrode layer is also composed of a plurality of sensing areas 241 that are arranged as a regular sensing array, as shown in FIG. 2D. The sensing areas 241 are connected to each other in the y-direction, so that an electrical connection in the y-direction for the sensing structure is established. By means of the bridge connection of the first electrode layer and the connection of the second electrode layer, which have the respective sensing areas electrically connected in different directions, the electrical connections respectively in the x-direction and the y-direction are simultaneously established through the respective sensing areas 221 and 241. Accordingly, the two-dimensional sensing structure 2 of a capacitive touch panel of the present invention is fabricated.

Figure 2E:
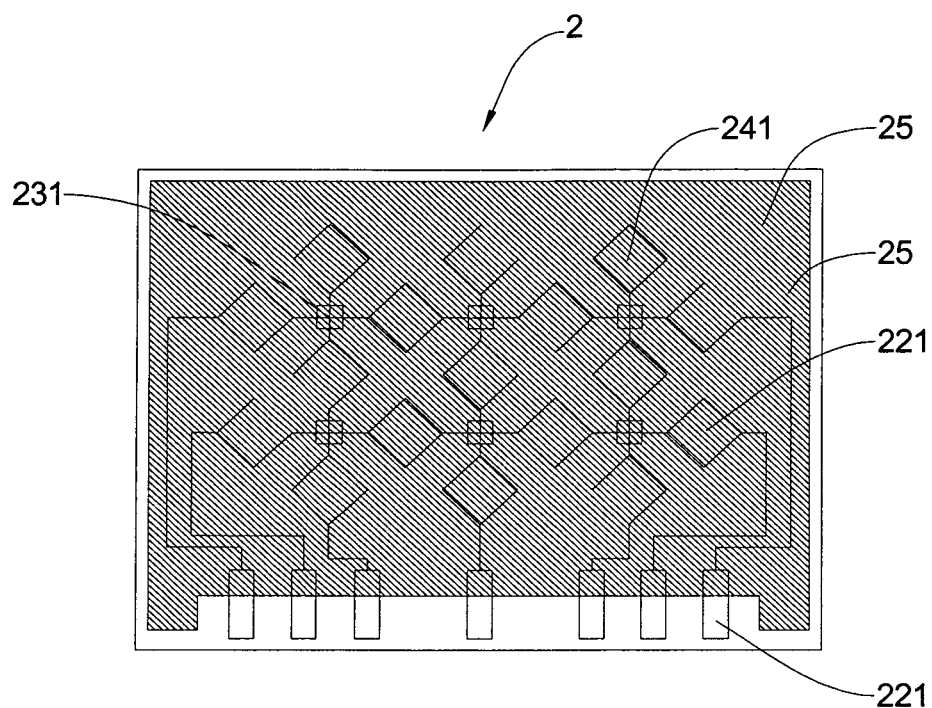

The protection layer 25 is finally provided to cover the second electrode layer for protecting the mentioned electrode layers and the conductive traces of the sensing structure except for the metallic contact strips 211. The contact strips 211 are exposed so as to establish the electrical connection to the external of the sensing structure thereby, as shown in FIG. 2E.

Figure 2F:
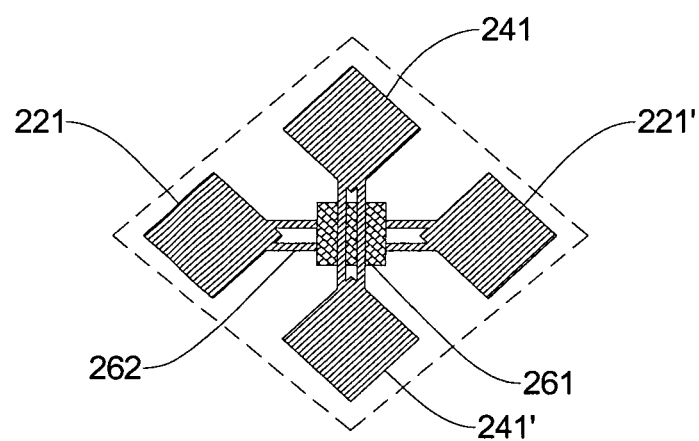
FIG. 2F is an enlarged view showing the sensing areas of the sensing structure of the capacitive touch panel of the preferred embodiment of the present invention.

By the use of locally distributing insulating dots 231, a full insulating layer of the conventional sensing structure, for insulating the electrode layer from another, is not needed in this embodiment. The present invention is thus advantageous in not only material-saving but a reduced thickness of the touch panel. Furthermore, while the sensing areas 221, 221' and 241, 241' are of diamond-like shape as shown in FIG. 2F, sensing areas of other kinds of shapes are also possible which will be illustrated in the following. As shown in FIG. 2F, two adjacent sensing areas 221 and 221' of the electrode layer are connected in the x-direction through at least one, preferably two, conductive trace 262, while the sensing areas 241 and 241' of the other electrode layer are connected in the y-direction through at least one, preferably two, conductive trace 261, so as to ensure that the disconnection of sensing structure may not occur in case of the fault of a single bridge.

Figure 3:
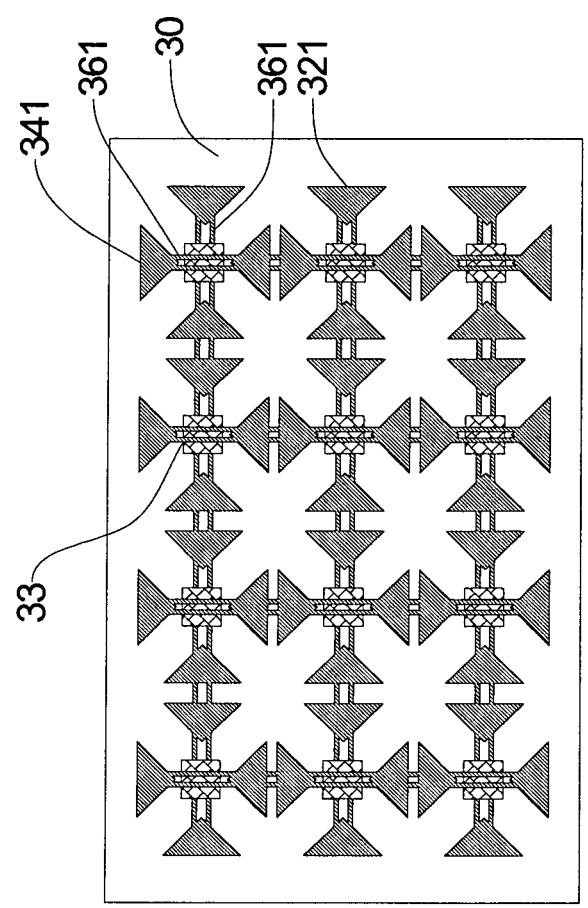
FIG. 3 is a schematic view showing the sensing areas of the sensing structure of the capacitive touch panel of another preferred embodiment of the present invention.
Figure 4:
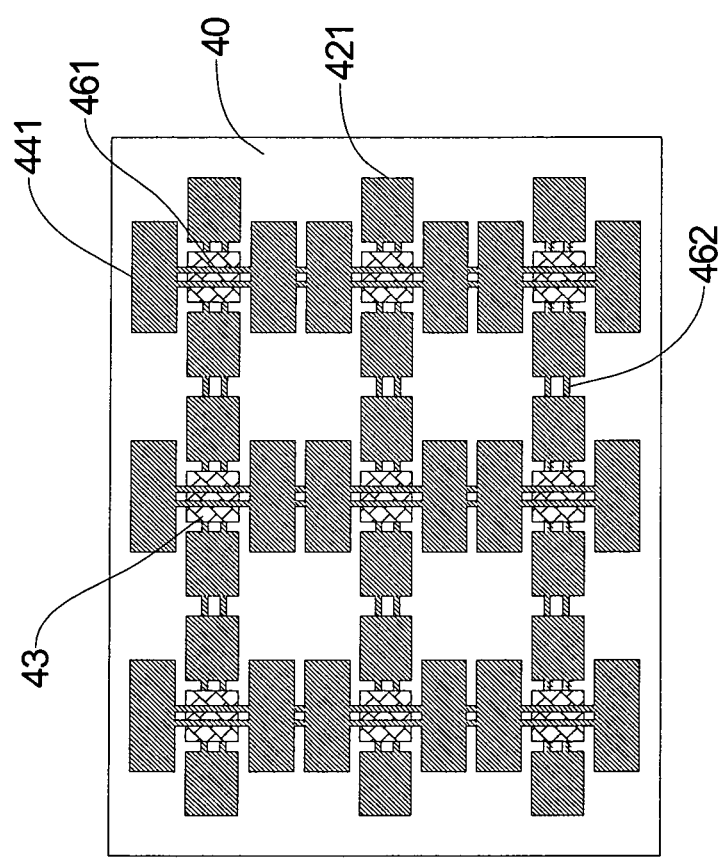
FIG. 4 is a schematic view showing the sensing areas of the sensing structure of the capacitive touch panel of still another preferred embodiment of the present invention

In addition to the diamond-shaped sensing areas, other kinds of shapes are possible for the sensing areas for enhancing the sensibility of the sensory structure. For example, the sensing areas of the first electrode layer and second electrode layer are arranged as arrays of triangular units 321 and 341 formed on the substrate 30, or rectangular units 421 and 441 formed on the substrate 40, as shown in FIGS. 3 and 4 respectively. Two adjacent units are connected with each other in the x-direction through two conductive traces 362 and in the y-direction through two conductive traces 361, where the units of different electrode layer, i.e. units 321 and 341, are insulating from each other with the insulating body 33. Also, two adjacent units 421 are connected with each other in the x-direction through two conductive traces 462, while the other two adjacent units 441 are connected with each other in the y-direction through two conductive traces 461. It is found that such arrangement provides the present capacitive touch panel of a predetermined size with a significantly increased sensing sensitivity in comparison with the conventional ones.

Figure 5A:
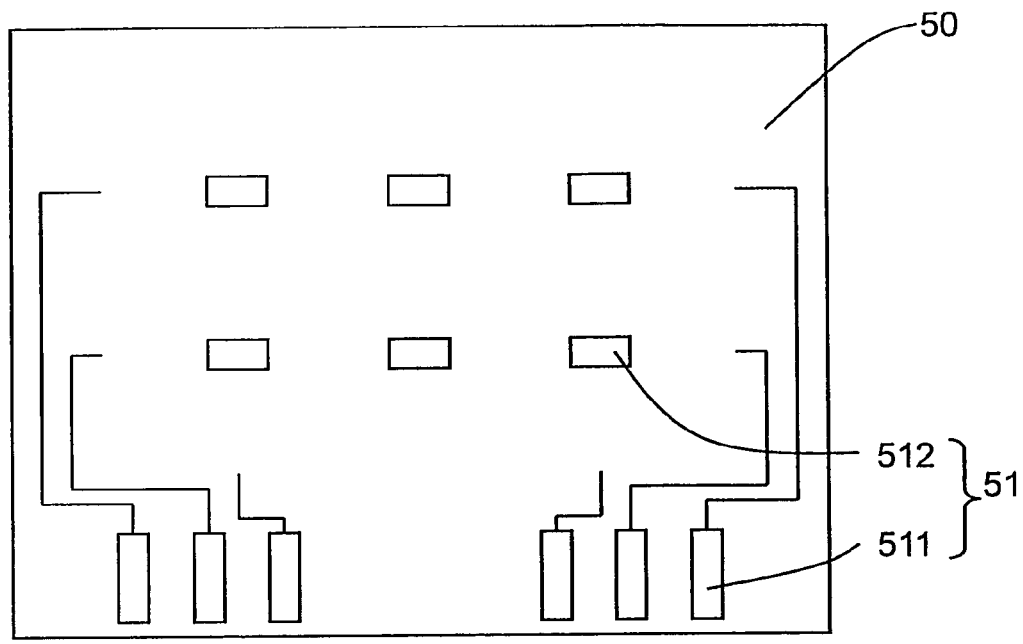
FIGS. 5A to 5D are top views schematically showing the sensing structure of a capacitive touch panel in accordance with another preferred embodiment of the present invention.
Figure 5B:
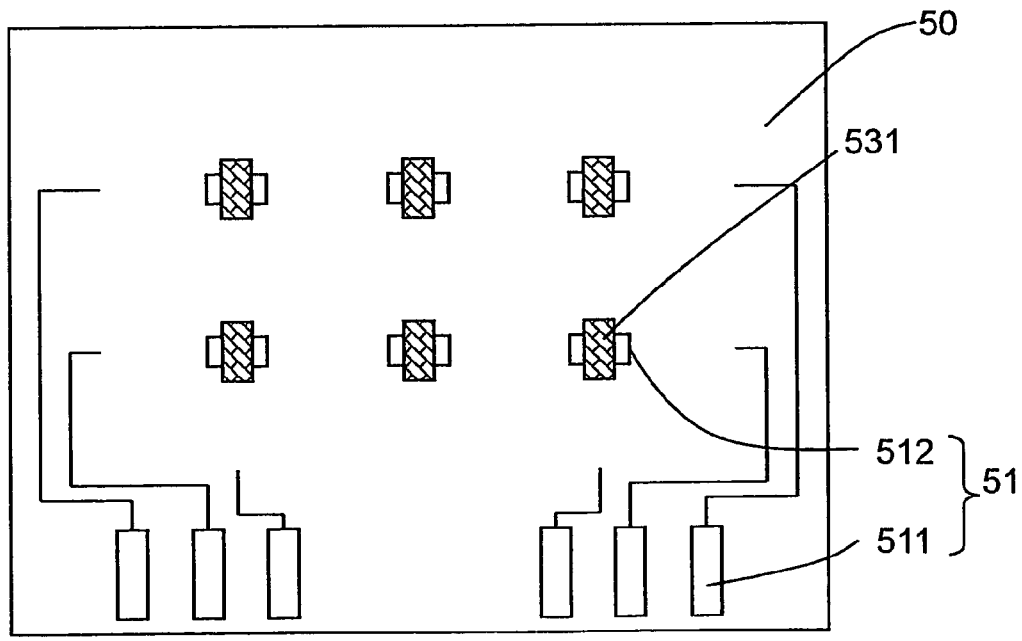
Figure 5C:
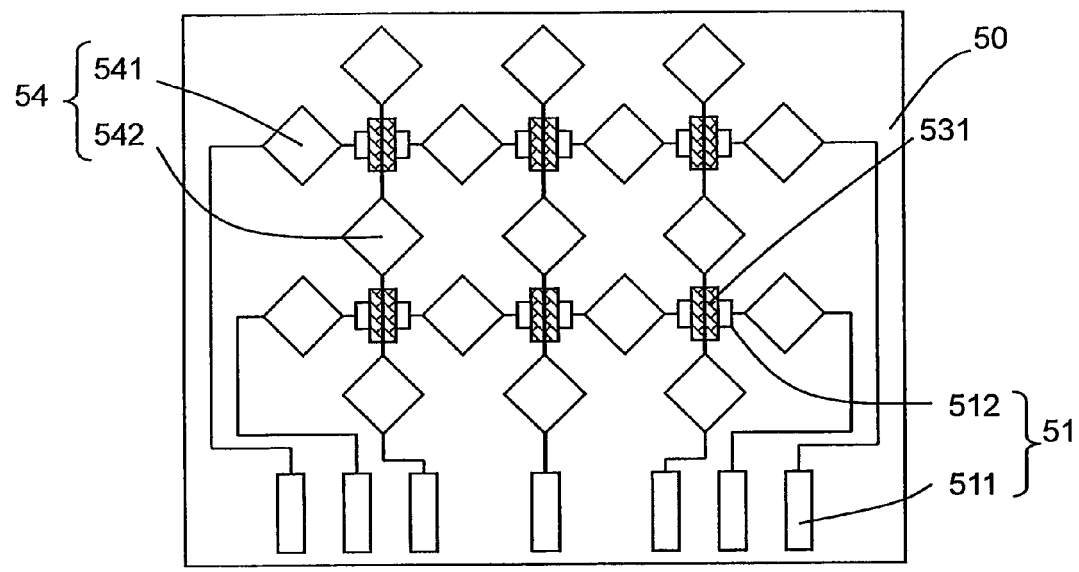
Figure 5D:
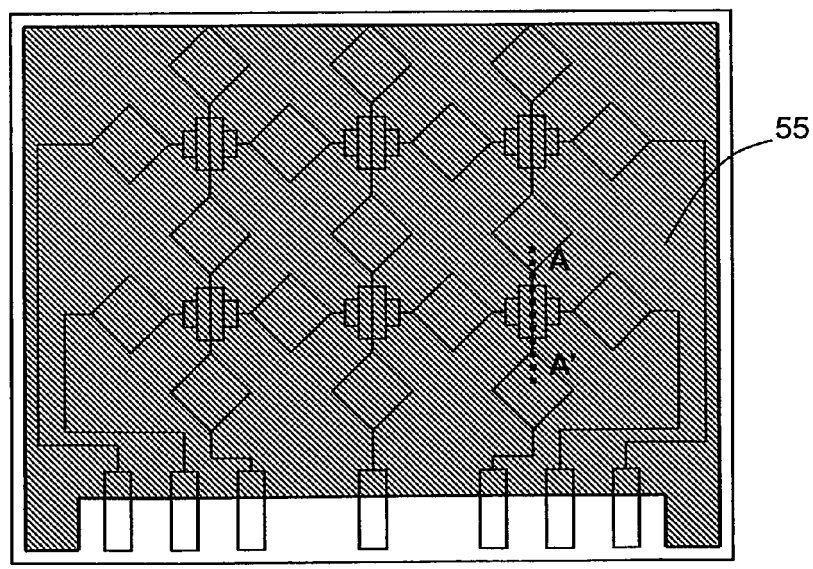
Figure 6:
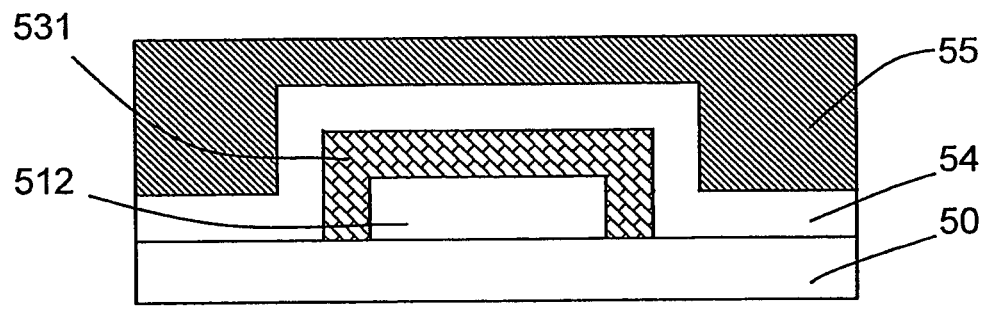
FIG. 6 is a cross-sectional view taken along line AA' of FIG. 5D, showing the sensing structure of a capacitive touch panel in accordance with the preferred embodiment of the present invention.

With reference to FIGS. 5A to 5D and FIG. 6, the sensing structure of a capacitive touch panel in accordance with the second preferred embodiment of the present invention is illustrated, wherein FIG. 6 shows a cross-sectional view taken along line AA' of FIG. 5D.

As shown in FIG. 5A, a metal layer 51 is first provided on the glass substrate 50. The metal layer 51 is patterned as contact strips as well as the bridge structure. In other words, the glass substrate 50 is thus provided with a plurality of metallic contact strips 511 and metallic bridge structures 512 on the surface thereof, wherein the metallic contact strips 511 are serving for electrical connections to the external and the metallic bridge structures 512 arranged in the x-direction are serving for connecting the sensing areas in the x-direction.

Similar to the first embodiment, a layer of insulating pattern is provided on the metal layer 51, so as to replace the overcoat of a conventional sensing structure. The layer of insulating pattern is of plural insulating dots 531, and each of which is located on a position corresponding to the respective bridge structures 512 of the metal layer 51. In this embodiment, however, each of the insulating dots 531 is provided to cover each of the respective metallic bridge structures 512, as shown in FIG. 5B.

Afterward, as shown in FIG. 5C, an electrode layer 54 is provided on the layer of insulating pattern 53. The electrode layer 54 is an electrode layer of a form of two-dimensional regular sensing array, i.e. an electrode layer composed of a plurality of sensing areas 541 and 542 that are two-dimensionally arranged in plane. In this embodiment, the electrode layer 54 of sensing areas 541 and 542 are aligned in such a way that the sensing areas 541 are electrically connected to each other in the x-direction via the respective metallic bridge structures 512, and are insulated from the sensing areas 542 electrically connected to each other in the y-direction by the respective insulating dots 531. In this case, the sensing areas having electrical connections respectively in the x-direction and the y-direction are simultaneously obtained in a single procedure, and thereby the two-dimensional sensing structure of a capacitive touch panel of the present invention is fabricated.

The protection layer 55 is finally provided to cover the electrode layer 54 for protecting the mentioned electrode layers and the conductive traces of the sensing structure except for the metallic contact strips 511. The contact strips 511 are exposed so as to establish the electrical connection to the external of the sensing structure thereby, as shown in FIG. 5D and FIG. 6.

Figure 7:
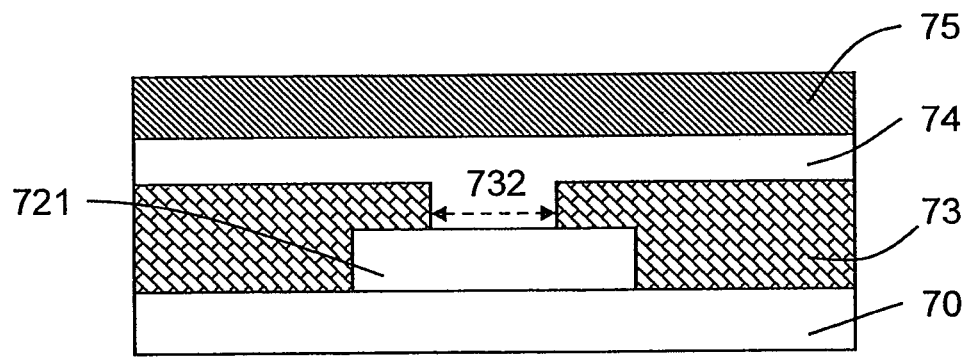
FIG. 7 is a cross-sectional view showing the sensing structure of a capacitive touch panel in accordance with a further preferred embodiment of the present invention.

With reference to FIG. 7, the sensing structure of a capacitive touch panel in accordance with the third preferred embodiment of the present invention is illustrated. Similarly, the two-dimensional sensing structure 7 of the present invention includes a first electrode layer on the glass substrate 70, which is composed of a regular array of sensing areas 721. A layer of insulating pattern 73 is provided for replacing the overcoat of a conventional sensing structure, wherein the layer of insulating pattern is of plural pin holes 732, and each of which is formed on a position corresponding to the respective sensing areas 721 of the first electrode layer, so as to expose the sensing areas 721. The layer of insulating pattern 73 is covered with a second electrode layer, where the second electrode layer is partially connected to the sensing areas 721 of the first electrode layer through the pin holes 732 of the layer of insulating pattern 73. Also, a protection layer 75 is provided on the second electrode layer to protect the fabricated structure. By means of the bridge connection of the first electrode layer and the connection of the second electrode layer, which have the respective sensing areas electrically connected in different directions, the electrical connections respectively in the x-direction and the y-direction are simultaneously established through the respective sensing areas. Accordingly, the two-dimensional sensing structure of a capacitive touch panel of the present invention is fabricated.

In the present invention, not only the conventional metallic electrode layer but also the indium tin oxide (ITO) electrode layer is adoptable for serving as the electrode of the sensing structure. Preferably, the combination of metal and ITO layer is also applicable in the present invention.

Figure 8:
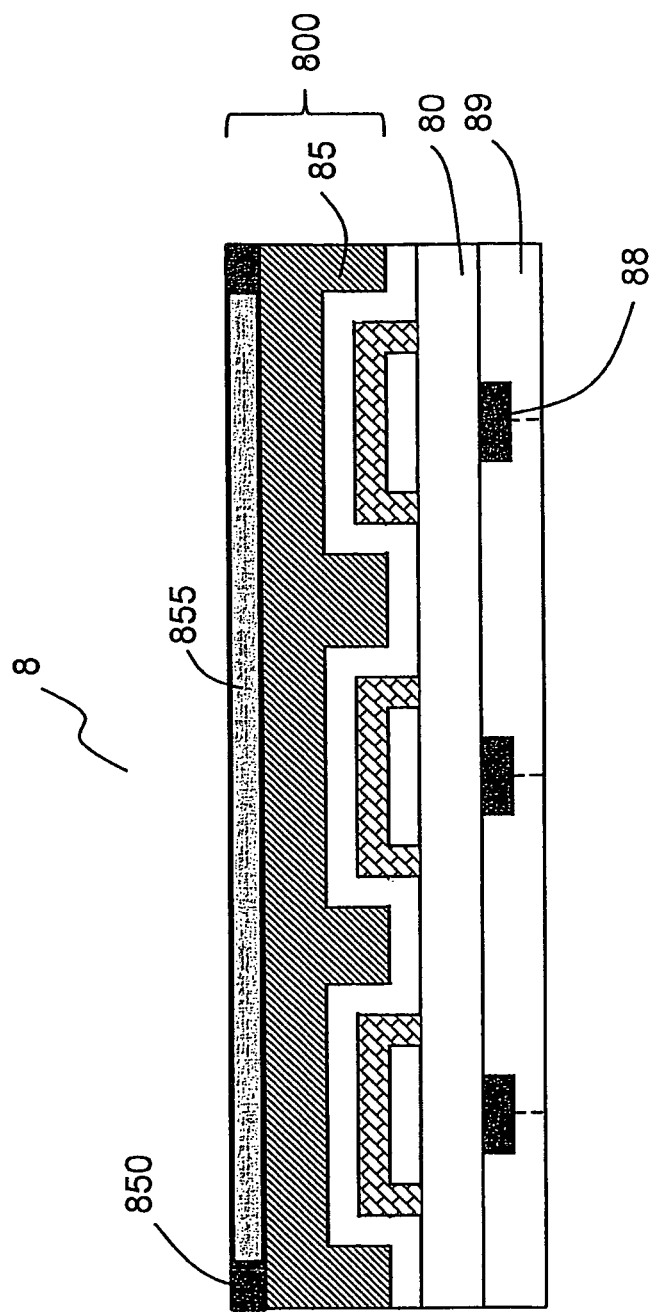
FIG. 8 is a cross-sectional view showing a capacitive touch panel in accordance with a preferred embodiment of the present invention.

With reference to FIG. 8, a cross-sectional view showing a capacitive touch panel 8 in accordance with a preferred embodiment of the present invention is schematically illustrated. According to this embodiment, the electrode layer is provided with a mark for the alignment of sensing areas, so as to further form a color filter 89 having a black matrix (BM) 88 formed therein on the other surface, the surface opposing to which the two-dimensional sensing structure 800 is located on, of the substrate 80. For this purpose, a conventional pre-alignment procedure is also adoptable. In addition to the mentioned embodiments, such an electrode/CF or electrode/BM bi-structure is also applicable in the conventional touch panel, so as to reduce the use of substrates, and thus the thickness of panel can be effectively decreased.

In another embodiment, the protection layer 85 of the sensing structure 800 is provided with a pattern layer 850 on either side thereof, so as to provide the panel 8 with an appearance of periphery-like pattern. Preferably, the protection layer 85 is also optically-treated, for example, coated with an optical layer 855, so as to exhibit a desired optical property such as anti-reflection, anti-glare or anti-static.

According to the present invention, the pattern layer 850 and/or the optical coating layer 855 is preferably pre-formed on the protection layer 85 and integrally attached on the second electrode layer. Alternatively, the pattern layer 850 and/or the optical coating layer 855 can be separately formed on the protection layer 85, so as to exhibit the desired property.

The layer of insulating pattern, composed of plural locally-distributed insulating dots, is adopted in the present invention, so that the use of conventional full insulating layer is eliminated. In this case, the total thickness of the sensing structure of the present invention effectively reduced up to 0.5 to 3 μm. Moreover, in comparison with the conventional sensing structure of a touch panel, the sensing structure according to the present invention can be fabricated by a much simplified procedure because of the alignment effect of the insulating dots associated with the metallic bridge structures, and the whole structure of the two-dimensional sensing structure is simplified. Furthermore, since the two-dimensional sensing structure of the present invention adopts only a single substrate as well as the ITO electrode with the electrode layer on the substrate, the resistance of the sensing structure is significantly decreased and the sensitivity thereof is accordingly improved.

Based on the above, the two-dimensional sensing structure of a capacitive touch pane according to the present invention is advantageous in that the structure thereof and the fabrication therefore is simplified, the thickness thereof is decreased and the resistance thereof is reduced, which is applicable for the demands for electronic devices of compactness.

While the invention has been described by way of examples and in terms of preferred embodiments, it is to be understood that various changes, substitutions, and alterations can be made herein without departing from the spirit and scope of the invention as defined by the appended claims.

What is claimed is:

1. A two-dimensional sensing structure of a capacitive touch panel, comprising:
   a substrate having a plurality of metallic structures on a first surface thereof;
   a first electrode layer located on said first surface and comprising a plurality of first sensing areas, wherein said first sensing areas are electrically connected with each other through a plurality of first conductive traces in a first direction;
   a dot-like insulating layer located on said first electrode layer and comprising a plurality of insulating bodies, wherein said insulating bodies are respectively positioned correspondingly to said first sensing areas; and
   a second electrode layer located on a surface of said dot-like insulating layer opposite to said first surface and comprising a plurality of second sensing areas, wherein said second sensing areas are electrically connected with each other through a plurality of second conductive traces in a second direction different from said first direction, and wherein said insulating bodies are positioned at the intersections of said first conductive traces and said second conductive traces without overlapping any of said first sensing areas and said second sensing areas;
   wherein each of said first and second conductive traces having at least two conductive bridges and the at least two conductive bridges ensure that a disconnection of the two-dimensional sensing structure does not occur in case of the fault of one of the at least two conductive bridges.

2. The two-dimensional sensing structure of claim 1, further comprising a protection layer on said second electrode layer.

3. The two-dimensional sensing structure of claim 2, wherein said protection layer comprises a pattern layer on either one side thereof, so as to provide an appearance of periphery-like pattern.

4. The two-dimensional sensing structure of claim 3, wherein said protection layer is provided with said pattern layer before being attached on said second electrode layer.

5. The two-dimensional sensing structure of claim 2, wherein said protection layer comprises an optical coating layer on either one side thereof which is one selected from a group consisting of an anti-reflection layer, an anti-glare layer and an anti-static layer.

6. The two-dimensional sensing structure of claim 5, wherein said protection layer is provided with said optical coating layer before being attached on said second electrode layer.

7. The two-dimensional sensing structure of claim 1, further comprising a color filter layer having a black matrix layer on a second surface of said substrate, wherein said second surface is opposite to said first surface.

8. The two-dimensional sensing structure of claim 1, wherein said first sensing areas and said second sensing areas are arranged as a first array and a second array respectively.

9. The two-dimensional sensing structure of claim 8, wherein each of said first and second sensing areas is shaped as one selected from a group consisting of diamond, rectangular, triangular and a combination thereof.

10. A two-dimensional sensing structure of a capacitive touch panel, comprising:
   a substrate having a plurality of first conductive structures and having a plurality of second conductive structures for external connection;
   a dot-like insulating layer located on said substrate and comprising a plurality of insulating bodies, wherein each of said insulating bodies is positioned correspondingly to each of said first conductive structures respectively; and
   an electrode layer located on said dot-like insulating layer and comprising an array of sensing areas;
   wherein a first portion of said sensing areas are electrically connected with each other in a first direction through at least one of said first conductive structures, a second portion of said sensing areas are electrically connected with each other through at least one of said second conductive structures in a second direction different from said first direction; and wherein said insulating bodies are positioned at the intersections of said first conductive structures and said second conductive structures without overlapping any of said sensing areas;
   wherein each of said first and second conductive structures having at least two conductive bridges and the at least two conductive bridges ensure that a disconnection of the two-dimensional sensing structure does not occur in case of the fault of one of the at least two conductive bridges.

11. The two-dimensional sensing structure of claim 10, further comprising a protection layer on said electrode layer.

12. The two-dimensional sensing structure of claim 11, wherein said protection layer comprises a pattern layer on either one side thereof, so as to provide an appearance of periphery-like pattern.

13. The two-dimensional sensing structure of claim 12, wherein said protection layer is provided with said pattern layer before being attached on said second electrode layer.

14. The two-dimensional sensing structure of claim 11, wherein said protection layer comprises an optical coating layer on either one side thereof which is one selected from a group consisting of an anti-reflection layer, an anti-glare layer and an anti-static layer.

15. The two-dimensional sensing structure of claim 14, wherein said protection layer is provided with said optical coating layer before being attached on said second electrode layer.

16. The two-dimensional sensing structure of claim 10, wherein each of said sensing areas is shaped as one selected from a group consisting of diamond, rectangular, triangular and a combination thereof.

17. The two-dimensional sensing structure of claim 10, further comprising a color filter layer having a black matrix on a second surface of said substrate, wherein said second surface is opposite to said first surface.

* * * * *